(12) United States Patent
Vallapaneni et al.

(10) Patent No.: US 8,533,377 B2
(45) Date of Patent: Sep. 10, 2013

(54) SYSTEM AND METHOD FOR ALLOCATING TRANSACTION ID IN A SYSTEM WITH A PLURALITY OF PROCESSING MODULES

(75) Inventors: Venkat Rao Vallapaneni, Bangalore (IN); Srinivasa Rao Kothamasu, Addanki Post & Mandal (IN); Sakthivel Komarasamy Pullagoundapatti, Bangalore (IN)

(73) Assignee: LSI Corporation, San Jose, CA (US)

( * ) Notice: Subject to any disclaimer, the term of this patent is extended or adjusted under 35 U.S.C. 154(b) by 284 days.

(21) Appl. No.: 13/118,376

(22) Filed: May 28, 2011

(65) Prior Publication Data
US 2012/0303848 A1    Nov. 29, 2012

(51) Int. Cl.
*G06F 13/00* (2006.01)
*G06F 13/364* (2006.01)

(52) U.S. Cl.
CPC ................................ *G06F 13/364* (2013.01)
USPC ........................................................ 710/110

(58) Field of Classification Search
USPC .............. 710/104–110, 8–19, 306–309
See application file for complete search history.

(56) References Cited

U.S. PATENT DOCUMENTS

| | | | |
|---|---|---|---|
| 6,058,464 A * | 5/2000 | Taylor ............................ | 711/217 |
| 7,594,052 B2 | 9/2009 | Radulescu et al. | |
| 2003/0188062 A1 * | 10/2003 | Luse et al. ..................... | 710/104 |
| 2008/0270656 A1 * | 10/2008 | Bracamontes Del Toro . | 710/110 |
| 2008/0270667 A1 * | 10/2008 | Bracamontes Del Toro . | 710/306 |
| 2009/0024783 A1 * | 1/2009 | Rhim et al. .................... | 710/316 |
| 2011/0055439 A1 * | 3/2011 | Chen et al. ...................... | 710/57 |
| 2011/0289253 A1 * | 11/2011 | Mangano et al. ............. | 710/310 |

* cited by examiner

*Primary Examiner* — Raymond Phan
(74) *Attorney, Agent, or Firm* — Mendelsohn, Drucker & Dunleavy, P.C.; Steve Mendelsohn (57) ABSTRACT

A system and method for allocating transaction ID in a system with a plurality of processing modules is disclosed. In one embodiment, a method for assigning transaction ID to a processing module in a network on a chip system (NOCS) with a plurality of processing modules is disclosed. An address space is provided to each of the processing modules. A portion of the address space is selected. A subset of the selected portion of the address space for each of the processing module is selected as Valid Bits. The Valid Bits of the processing module is associated to a transaction ID.

18 Claims, 7 Drawing Sheets

| SLAVE NO (402) | ADDRESS SPACE: BITS [31:0] HEX REPRESENTATION (404) | UPPER 8 ADDRESS BITS BITS [31:24] (410) | MAP 1 (412) | MAP 2 (414) |
|---|---|---|---|---|
| S0 | 0X0000_0000 - 0X0FFF_FFFF | 0000_XXXX | 000 | 000 |
| S1 | 0X1000_0000 - 0X10FF_FFFF | 0001_0000 | 001 | 100 |
| S2 | 0X1100_0000 - 0X11FF_FFFF | 0001_0001 | 010 | 011 |
| S3 | 0X2000_0000 - 0X3FFF_FFFF | 001X_XXXX | 011 | 001 |
| S4 | 0X4000_0000 - 0X5FFF_FFFF | 010X_XXXX | 100 | 010 |
| S5 | 0XA000_0000 - 0XBFFF_FFFF | 101X_XXXX | 101 | 101 |
| S6 | 0XC000_0000 - 0XDFFF_FFFF | 110X_XXXX | 110 | 110 |
| S7 | 0XE000_0000 - 0XFFFF_FFFF | 111X_XXXX | 111 | 111 |

| MASTER-SLAVE | CY0 | CY1 | CY2 | CY3 | CY4 | CY5 | CY6 | CY7 | CY8 | CY9 | CY10 |
|---|---|---|---|---|---|---|---|---|---|---|---|
| DMA M0 | S1_0 | - | S1_1 | - | S1_2 | - | S1_3 | S6_0 | S6_1 | S6_2 | S6_3 |
| SLAVE S1 | S1_0 | | S1_1 | | S1_2 | | S1_3 | | | | |
| SLAVE S6 | S6_0 | S6_0 | S6_0 | S6_0 | S6_0 | S6_0 | S6_0 | S6-0 | S6_1 | S6_2 | S6_3 |

| SLAVE NO | ADDRESS SPACE: BITS [31:0] HEX REPRESENTATION | UPPER 8 ADDRESS BITS [31:24] | MAP 1 | MAP 2 |
|---|---|---|---|---|
| S0 | 0X0000_0000 – 0X0FFF_FFFF | 0000_XXXX | 000 | 000 |
| S1 | 0X1000_0000 – 0X10FF_FFFF | 0001_0000 | 001 | 100 |
| S2 | 0X1100_0000 – 0X11FF_FFFF | 0001_0001 | 010 | 011 |
| S3 | 0X2000_0000 – 0X3FFF_FFFF | 001X_XXXX | 011 | 001 |
| S4 | 0X4000_0000 – 0X5FFF_FFFF | 010X_XXXX | 100 | 010 |
| S5 | 0XA000_0000 – 0XBFFF_FFFF | 101X_XXXX | 101 | 101 |
| S6 | 0XC000_0000 – 0XDFFF_FFFF | 110X_XXXX | 110 | 110 |
| S7 | 0XE000_0000 – 0XFFFF_FFFF | 111X_XXXX | 111 | 111 |

SYSTEM AND METHOD FOR ALLOCATING TRANSACTION ID IN A SYSTEM WITH A PLURALITY OF PROCESSING MODULES

FIELD OF TECHNOLOGY

Embodiments of the present invention relate to a system with a plurality of processing modules communicating over a network. More particularly, embodiments of the present invention relate to a system implemented as a network on a chip, wherein the processing modules allocate transaction ID to communicate with the other plurality of processing modules.

BACKGROUND

Network on a chip based systems (NOCS) are systems wherein a plurality of processing modules are coupled to each other over a network interface. Some of the processing modules may be master processing modules (Master) who initiate transactions. Some of the processing modules may be slave processing modules (Slave) who receive the transactions from the Master and process the transactions. The NOCS may follow various architectures or standards so as to communicate and transact between the plurality of processing modules.

One such architecture is Advanced Micro controller Bus Architecture (AMBA). Advanced eXtensible Interface (AXI) is one of the bus standards supported by AMBA. AXI consists of five independent channels: Address Write (AW), Address Read (AR), Write data (W), Read data (R), and Write response (B). These multiple independent channels provide for better support for out-of-order transaction completion. These independent channels are utilized using a transaction ID, when a transaction is in progress.

In an AXI system, out of order transaction is achieved by using independent transaction ID. Number of different transaction IDs issued by a Master depends on the internal characteristic of the Master. For example, in a Direct Memory Access (DMA) Master, the number of transaction IDs may be limited to the number of DMA channels available in the DMA Master. In a processor based Master, the number of transaction IDs may be limited to the number of cache line fetches, instruction and data fetches etc. Due to these limited transaction IDs, requests that are issued to a Slave with the same transaction ID would be completed in order, by the Slave. This may in some systems lead to inefficient system bandwidth utilization. Inefficient system bandwidth may lead to inferior system performance.

Existing techniques for transaction ID allocation may not efficiently utilize available system bandwidth and may lead to poor system performance.

SUMMARY

A system and method for allocating transaction ID in a system with a plurality of processing modules is described. According to one aspect of the present invention, in a method for assigning transaction ID to a processing module in a network on a chip system (NOCS) with a plurality of processing modules an address space is provided to each of the processing modules. A portion of the address space is selected and a subset of the portion of the address space for each of the processing module is selected as Valid Bits. The Valid Bits of the processing module is associated to a transaction ID.

According to yet another aspect of the present invention, a non-transitory computer readable storage medium having instructions that when executed by a computing device causes the computing device to perform the method as described above.

According to yet another aspect of the present invention, a network on a chip system (NOCS) is described. The system includes a plurality of processing modules. Each processing module is assigned an address space. A logic to specify a subset of the portion of the address space selected from the address space for each of the processing module as Valid Bits; and a logic to associate the Valid Bits of the processing module to a transaction ID is provided.

The methods and systems disclosed herein may be implemented in any means for achieving various aspects, and other features will be apparent from the accompanying drawings and from the detailed description that follow.

BRIEF DESCRIPTION OF THE DRAWINGS

Various preferred embodiments are described herein with reference to the drawings, wherein.

The drawings described herein are for illustration purposes only and are not intended to limit the scope of the present invention in any way.

DETAILED DESCRIPTION

Systems and method for allocating transaction ID in a system with a plurality of processing modules is described. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
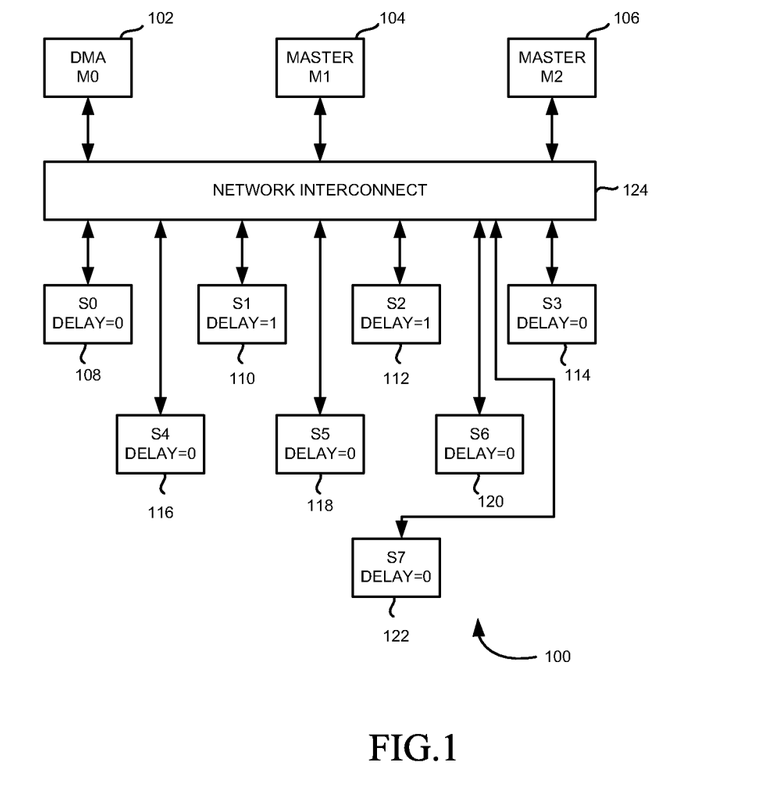
FIG. 1 illustrates an exemplary network on a chip based system with a plurality of processing modules, according to an embodiment of this invention.

More particularly, FIG. 1 illustrates an exemplary network on a chip based system 100 (NOCS) with a plurality of processing modules in accordance with some embodiments. NOCS 100 includes a plurality of processing modules 102-122. The processing modules may be a Master or a Slave. As an example, the NOCS 100 includes three Master processing modules, Master M0 102, Master M1 104 and Master M2 106. A Master may be a DMA engine, a processor engine or any other type of processing unit capable of initiating transactions. As an example, the Master M0 102 may be a DMA Master. Structure, function and features of a Master, for example, Master M0 102 will be described later with reference to FIG. 1.

The NOCS 100 includes eight Slave processing units, Slave S0 108, Slave S1 110, Slave S2 112, Slave S3 114, Slave S4 116, Slave S5 118, Slave S6 120 and Slave S7 122. Each of the Slave may have an associated delay in processing in terms of system cycles and responding to a request received from a Master. For example, Slave S0 108 has a delay of 0, Slave S1 110 has a delay of 1. As an example, a delay of 1 indicates there is a one cycle delay between two consecutive transactions processed by the Slave.

The NOCS 100 further includes a Network Interconnect 124 (NI). The Master processing units and the Slave processing units are coupled to the NI 124 and communicate with each other, via the NI 124. The NI 124 manages communication traffic between various processing modules, using a predefined communication protocol.

The NOCS 100 may additionally implement one or more priority schemes so as to prioritize the processing of transactions between the processing modules. As an example, a Master with a lower number designation may have a higher priority. Similarly, a Slave with a lower number designation may have a higher priority. So, a transaction between Master M0 102 and Slave S0 108 will have a higher priority than a transaction between Master M2 106 and Slave S2 112. Additionally, transactions issued with the same transaction ID may be processed in the order it was received. As an example, if a transaction with transaction ID ID1 was issued for Slave S0 and another transaction with transaction ID ID1 was issued for Slave S6, the transaction issued to Slave S0 will be processed first and then, the transaction issued to Slave S6 will be processed. In one embodiment, the NI 124 implements the priority scheme.

Figure 2:
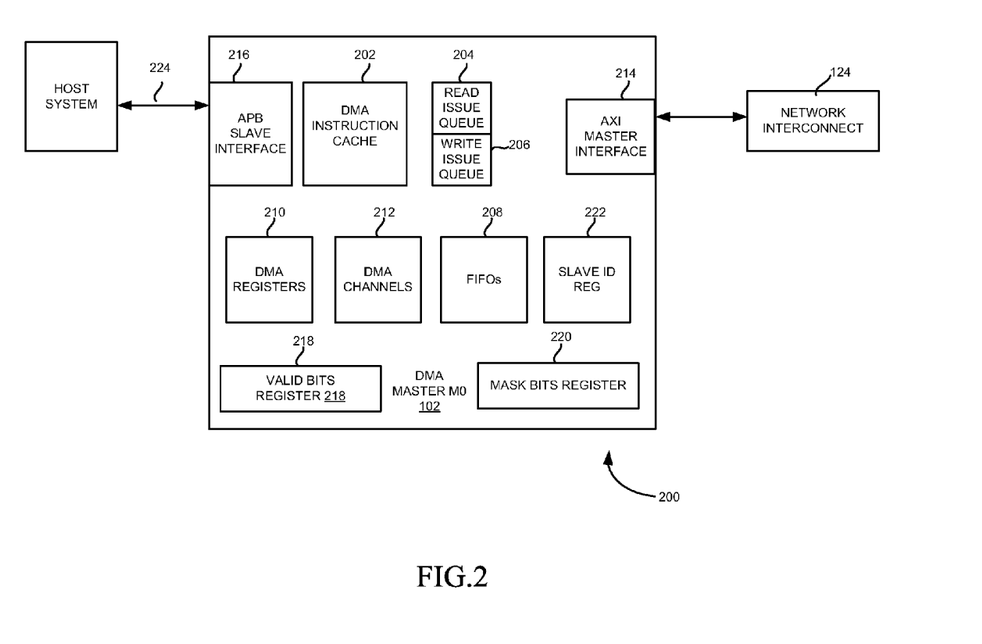
FIG. 2 illustrates an exemplary DMA master of the NOC based system, according to an embodiment of this invention.

Now, referring to FIG. 2, an exemplary Master processing module will be described. As an example, FIG. 2 shows Master M0 102 as a DMA processing module. The Master M0 102 includes a DMA instruction cache 202, a read issue queue 204, a write issue queue 206, a FIFO buffer 208, DMA registers 210, DMA channels 212, APB Slave interface 216 and AXI Master 214. The DMA instruction cache 202 stores instructions to be executed by the DMA channels 212. The DMA channels may include a plurality of channels, for example, four channels, CH0, CH1, CH2 and CH3. The APB Slave interface 216 is used to configure various registers. For example, the APB Slave interface 216 may be used to configure the DMA registers 210. In one embodiment, the APB Slave interface 216 may be coupled to the host system over APB Slave bus 224 to communicate with the host system. The FIFO buffers 208 are used to store channel instruction data. The DMA channel 212 decodes the instructions stored in the DMA instruction cache 202 and issues read instruction transactions or write instruction transaction. The read instruction transactions are stored in the read issue queue 204 and the write instruction transactions are stored in the write issue queue 206. The AXI Master 214 processes the transactions queued in the read issue queue 204 and the write issue queue 206.

In one embodiment, the DMA Master M0 102 may additionally include a set of Valid Bit Registers 218 and Mask Bit Registers 220. In one embodiment, the Valid Bit registers 218 and Mask Bit Registers 220 may be part of the DMA Registers 210. The function and features of Valid Bit Registers 218 and Mask Bit Registers 220 will be later described in more detail. In one embodiment, the APB Slave interface 216 may be used to configure the Valid Bit Registers 218 and Mask Bit Registers 220.

In one embodiment, each of the DMA channel uses a unique transaction ID. As an example, instructions issued by DMA channel CH0 may use transaction ID TID0. Similarly, DMA channel CH1 may use transaction ID TID1, DMA channel CH2 may use transaction ID TID2 and DMA channel CH3 may use transaction ID TID3. Each read or write instruction issued by a DMA channel will use the same transaction ID assigned to that channel.

Figure 3:
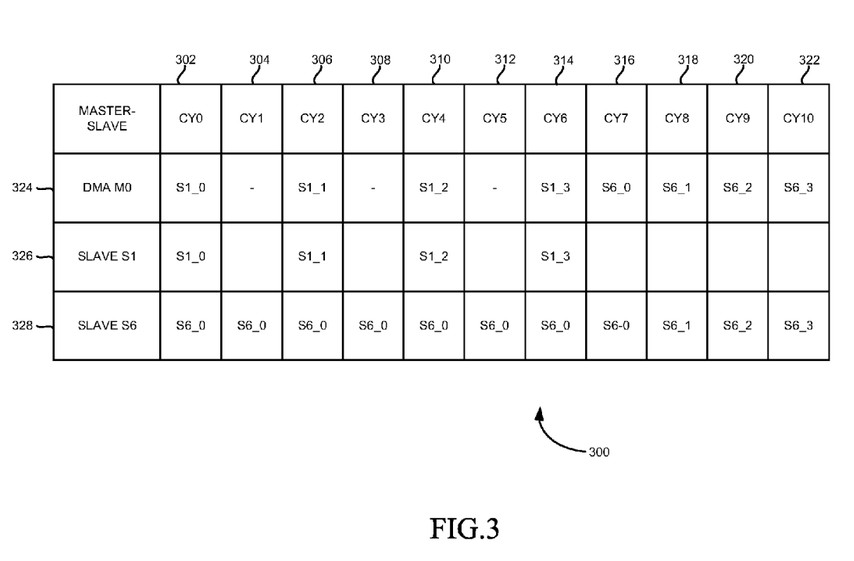
FIG. 3 illustrates an exemplary table showing the data flow for transactions with same transaction ID.

With reference to FIG. 1 and FIG. 3, an exemplary transaction flow for a single read request with a four beat read transfer issued from channel CH0 of DMA Master, to both Slave S1 and Slave S6 will now be described. Each beat refers to a single read transfer and there will be four read transfers each from both Slave S1 and Slave S6, for the single read request issued from CH0 of DMA Master. Referring to FIG. 1, delay associated with Slave S1 is 1 and the delay associated with Slave S6 is zero. So, two consecutive read transfers from Slave S1 can be completed after a minimum delay of one cycle. However, two consecutive read transfers from Slave S6 can be completed without any delay. As both read requests are issued from Channel CH0, the transaction ID used for the request will be the same (in this case, TID 0). Additionally, based on the assigned priority for the slaves (lower numbered Slaves are given higher priority than higher number Slaves), a request to Slave S1 is processed before a request to Slave S6.

FIG. 3 shows an exemplary table 300 showing the data flow for transactions with same transaction ID, in this case, TID 0, for both Slave S1 and Slave S6. Columns 302-322 show availability of data at each of the DMA Channel CH0 of Master M1, Slave S1 and Slave S6 at various cycles, CY0-CY10 respectively. Now, the processing of the four beat read request will be described with reference to table 300. Row 324 shows availability of data at DMA channel CH0, row 326 shows availability of data at Slave S1 and row 328 shows availability of data at Slave S6.

Now referring to column 302, at cycle CY0, read data corresponding to the first beat is available at both Slave S1 and DMA Channel CH0, based on the read request to Slave S1. The available data is depicted as S1_0, with S1 referring to the slave number and 0 referring to the first beat of the read request to Slave S1. As previously described, with the same transaction ID, read transactions to Slave S1 gets priority over read transactions to Slave S6. So, the next read transfer occurs from Slave S1. As there is a delay of one cycle at Slave S1, at cycle CY1 no read transfer occurs from Slave S1. So, cycle CY1 is an idle cycle and no data is available or transferred. Note that the read data corresponding to the first beat of read request to Slave S6 is available at Slave S6 at cycle CY0, depicted as S6_0, however, the read transfer from Slave S6 will not occur due to the lower priority to Slave S1.

At cycle CY2, after the delay of one cycle, the data corresponding to second beat of read request to Slave S1 is available at both Slave S1 and DMA Channel CH0. The available data is depicted as S1_1. Again, cycle CY3 will be an idle cycle.

At cycle CY4, after the delay of one cycle, the data corresponding to third beat of read request to Slave S1 is available at both Slave S1 and DMA Channel CH0. The available data is depicted as S1_2. Again, cycle CY5 will be an idle cycle.

At cycle CY6, after the delay of one cycle, the data corresponding to fourth beat of read request to Slave S1 is available at both Slave S1 and DMA Channel CH0. The available data is depicted as S1_3.

Now that all read requests to Slave S1 has been completed, at cycle CY7, the data corresponding to first beat of read request to Slave S6 is available at both Slave S6 and DMA Channel CH0. The available data is depicted as S6_0. As Slave S1 requires no delay between consecutive read requests, data corresponding to next three beats of read transfers are available at both Slave S6 and DMA Channel CH0 in three consecutive cycles CY8, CY9 and CY10, with the available data depicted as S6_1, S6_2 and S6_3 respectively.

As one skilled in the art appreciates, the processing of two requests with the same transaction ID may result in one or more idle cycles (for example, cycles CY1, CY3 and CY5), depending upon the delay associated with each of the Slaves and priority of each of the Slaves. Another embodiment of this invention is now described, where a different transaction ID is issued for each of the Slaves, based on a certain unique identifier for the Slave. In one embodiment, the unique ID may be derived from the address space assigned to the Slave.

Figure 4:
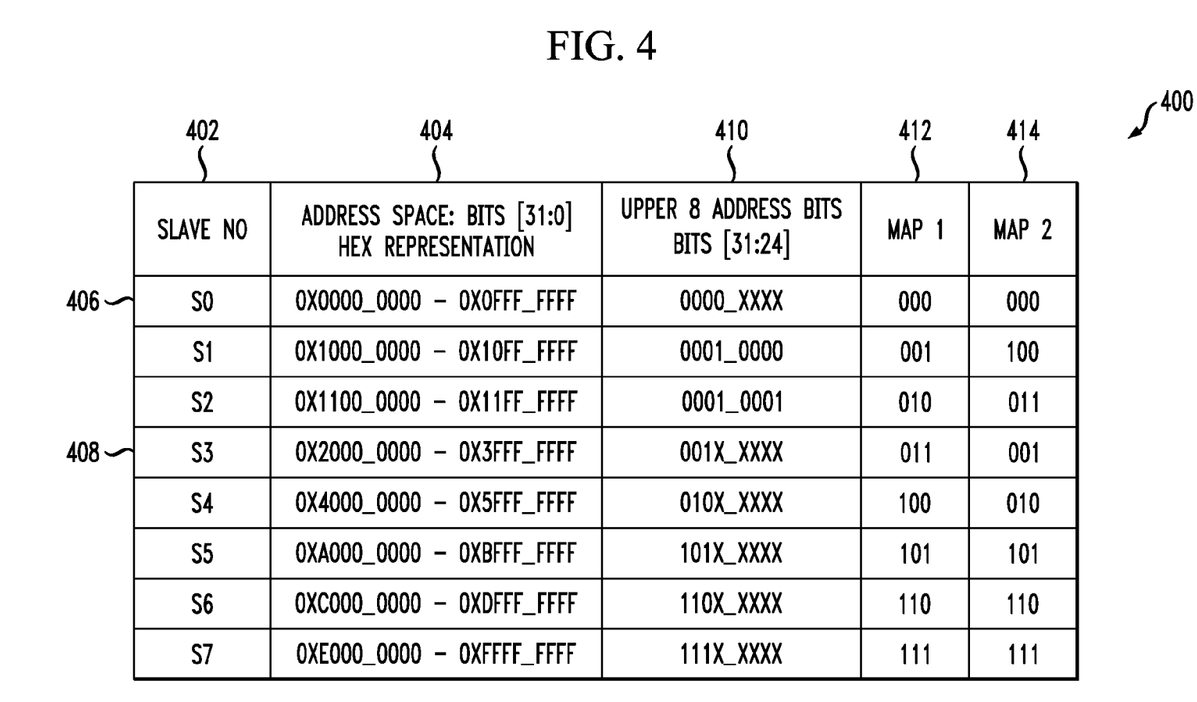
FIG. 4 illustrates an exemplary table showing the transaction ID assigned according to an embodiment of this invention.

Now, referring to FIG. 4, an exemplary address space allocation table 400 is described. The address space allocation table 400 shows address space allocated to each of the slaves, S0-S7. For example, slaves S0-S7 may each be a data storage device, or a single processing unit like Universal Serial Bus (USB), group of peripherals like Universal Asynchronous transceiver (UART) or a general purpose input/output (GPIO) device, with a starting address and an ending address. In some embodiments, the data storage device may be a dynamic random access memory (DRAM), read only memory (ROM) and the like.

In some embodiments, the NOCS may be part of a host system, which initializes and allocates various available resources in the NOCS to various applications. As an example, the host system may divide or partition a quantity of physical memory into Slaves S0-S7, allocating a portion of the physical memory to each of the Slaves S0-S7. The host system may store the allocated address space in each of the Masters, for example, registers contained in the Masters. In some embodiments, a slave with capability to process multiple transactions may be assigned multiple IDs. For example, Slave S0 may have capability to process multiple transactions, using two or more address spaces. In such situations, Slave S0 may be assigned different IDs, to utilize its capability to process multiple transactions.

As an example, referring back to FIG. 1 and FIG. 2, the address space mapping information for the slaves S0-S7 may be stored in the DMA register 210 of the DMA Master M0 102. In some embodiments, the host system may communicate with the DMA Master M0 102 using the APB Slave interface 216 and communicate the address space mapping information to the DMA Master M0. In some other embodiments, address space mapping information may be constants strapped as a part of DMA master M0 I/Os or master build time configurable design verilog define or parameter/VHDL generic.

Now, referring back to FIG. 4, table 400 shows various slaves S0-S7 with their corresponding address space allocation information. For example, column 402 shows various slaves S0-S7 and column 404 show their corresponding assigned address space range. As an example, the address is a 32 bit address represented in Hexadecimal format in column 404. Now referring to row 406, we notice that the address space [31:0] allocated to Slave S0 is 0x0000_0000 to 0x0FFF-FFFF and the address space [31:0] allocated to Slave S3 is 0x2000_0000 to 0x3FFF_FFFF. The prefix "0x" in the address space indicates the address is in Hexadecimal format.

In an embodiment of this invention, a portion of the address space of each of the Slaves S0-S7 is used to generate a unique ID for each of the Slaves S0-S7. The portion of the address space selected is common (or does not change) within the whole address space for the processing module. As an example, referring to column 410, a portion of the address space, in this case, bits [31:24] is selected. Additionally, some of the bits of the selected portion of the address space is selected to define a unique bit pattern to represent each of the Slaves S0-S7. These selected bits are referred to as "Valid Bits". The bits that are not used to define the unique bit pattern are represented as "x" in column 410. These bits are referred to as "Mask Bits".

As an example, for Slave S0, selected portion of the address space is 0000_xxxx. The Valid Bits for Slave S0 are bits [31:28] and Mask Bits are bits [27:24]. As another example, for Slave S2, selected portion of the address space is 0001_0001. The Valid Bits for Slave S2 are bits [31:24] and there are no Mask Bits.

The Valid Bits and Mask Bits for each of the slaves are stored in one or more registers of the Master. As an example, for DMA Master M0 102, the Valid Bits may be stored in Valid Bits Registers 218. Additionally, the Mask Bits may be stored in Mask Bits Registers 220 of DMA Master M0 102.

Now, referring back to FIG. 4, table 400, in column 412, an exemplary ID assigned to each of the Slaves S0-S7 is shown. For example, for Slave S1, an ID of 001 (binary) is assigned. For Slave S6, an ID of 110 (binary) is assigned. In one embodiment, the ID for slaves S0-S7 may be stored in Slave ID Registers 222. In one embodiment, the Valid Bits are used to access (or address) the Slave ID Register 222 and retrieve the corresponding ID for the Slaves S0-S7. In one embodiment, the Slave interface 216 may be used to configure the Slave ID Register 222.

In operation, when a request is processed by a Master, for example, DMA Master M0 102, the address for the request is available. The selective portion of the address, for example bits [32:28] of the address is selected and compared to the Valid Bit Registers and Mask Bit registers to find a match. Based on the initial set up of the Valid Bit Registers and Mask Bit Registers, a unique set of bits will be identified. This unique set of bits is mapped to the Slave ID Register 222 to identify the corresponding ID to be assigned to the request.

In column 412, the slave ID is assigned sequentially from 0x0-0x7, for each of the Slaves S0-Slave S7. In one embodiment, the slave ID may be assigned using a different sequence, for example, as shown in column 414. The different sequence selected may be based on various design considerations, for example, gate count required to implement the decoding logic.

Figure 5:
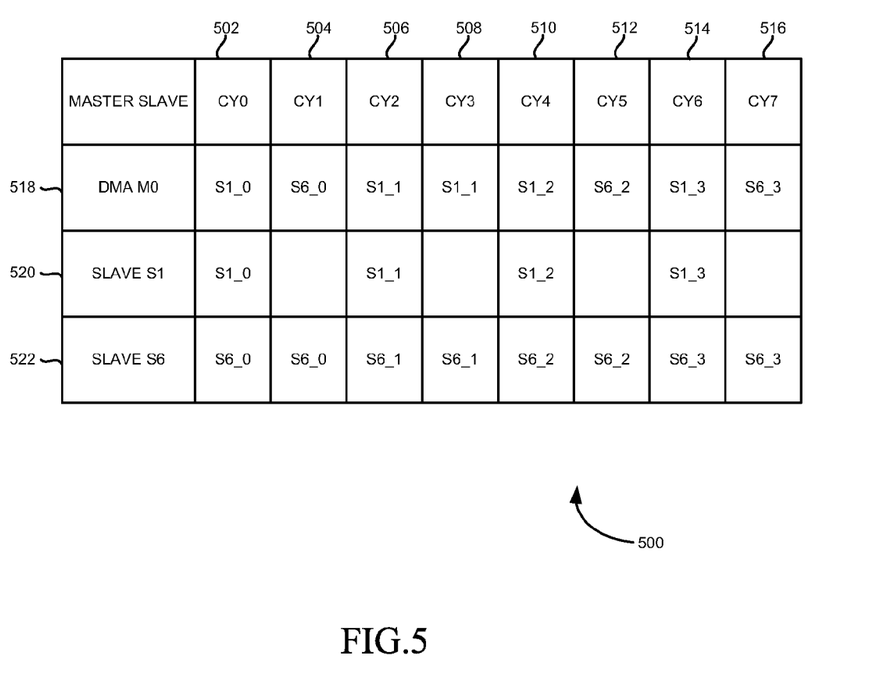
FIG. 5 illustrates an exemplary table showing the data flow for transactions with transaction ID assigned according to another embodiment of this invention.

FIG. 5 shows an exemplary table 500 showing the data flow for transactions with transaction ID as assigned according to alternate embodiment of this invention, in this case, referring to column 412 of table 400, Slave S1 TID is 0x1 and Slave S6 TID is 0x6. Columns 502-516 show availability of data at each of the DMA Channel CH0 of Master M1, Slave S1 and Slave S6 at various cycles, CY0-CY7 respectively. Now, the processing of the single read request with four beat read transfer will be described with reference to table 500. Row 518 shows availability of data at DMA channel CH0, row 520 shows availability of data at Slave S1 and row 522 shows availability of data at Slave S6.

Now referring to column 502, at cycle CY0, data corresponding to the first beat of the read request to Slave S1 is available at both Slave S1 and DMA Channel CH0. The available data is depicted as S1_0, with S1 referring to the slave number and 0 referring to the first read transaction of Slave S1. As previously described, even with different transaction ID, read transactions to Slave S1 gets priority over read transactions to Slave S6, during CY0 cycle due to Slave's lower number. At cycle CY0, data corresponding to the first beat of the read request to Slave S6 is available at Slave S6, but not at DMA Channel CH0, due to the lower priority of Slave S6 as compared to Slave S1. As there is a delay of one cycle at Slave S1, at cycle CY1 no read transfer occurs at Slave S1. However, as the transaction ID for Slave S6 is different, at cycle CY1, the read transfer corresponding to first beat for Slave S6 will occur and the data is available at both Slave S6 and DMA Channel CH0. The available data is depicted as S6_0, with S6 referring to Slave number and 0 referring to the first beat of read transfer for Slave S6.

At cycle CY2, between Slave S1 and Slave S6, Slave S1 gets the priority, due to its lower number. The data corresponding to the second beat is available at both Slave S1 and DMA Channel CH0. The available data is depicted as S1_1. At cycle CY2, data corresponding to the second beat of the read request to Slave S6 is available at Slave S6, but not at DMA Channel CH0, due to the lower priority of Slave S6 as compared to Slave S1. The available data is depicted as S6_1.

At cycle CY3, as the TIDs of Slave S1 and Slave S6 are different and Slave S1 has an idle cycle between two consecutive transfers, Slave S6 gets the cycle CY3 to transfer data. The data corresponding to the second beat of the read request to Slave S6 is now available at DMA Channel CH0. The available data is depicted as S6_1.

At cycle CY4, after the delay of one cycle, the data corresponding to the third beat of read is available at both Slave S1 and DMA Channel CH0, as Slave S1 has higher priority over Slave S6. The available data is depicted as S1_2. At cycle CY4, data corresponding to the third beat of the read request to Slave S6 is available at Slave S6, but not at DMA Channel CH0, due to the lower priority of Slave S6 as compared to Slave S1. The available data is depicted as S6_2.

At cycle CY5, as the TIDs of Slave S1 and Slave S6 are different and Slave S1 has an idle cycle between two consecutive transactions, Slave S6 gets the cycle CY3 to transfer data. The data corresponding to the second beat of the read request to Slave S6 is now available at DMA Channel CH0. The available data is depicted as S6_2.

At cycle CY6, after the delay of one cycle, the data corresponding to the fourth beat of read is now available at both Slave S1 and DMA Channel CH0. The available data is depicted as S1_3. At cycle CY6, data corresponding to the fourth beat of the read request to Slave S6 is available at Slave S6, but not at DMA Channel CH0, due to the lower priority of Slave S6 as compared to Slave S1. The available data is depicted as S6_3.

At cycle CY7, as all read requests to Slave S1 has been completed, the Slave S6 gets the cycle to transfer data to the DMA Channel CH0 and the data corresponding to the fourth beat of read is available at both Slave S6 and DMA Channel CH0 at cycle CY7. The available data is depicted as S6_3.

As one skilled in the art appreciates, using the alternate embodiment of TID assignment, both the read transactions to Slave S1 and Slave S6 were completed in eight cycles and there were no idle cycles in between. This increases the bandwidth utilization and improves the performance of the system.

Figure 6:
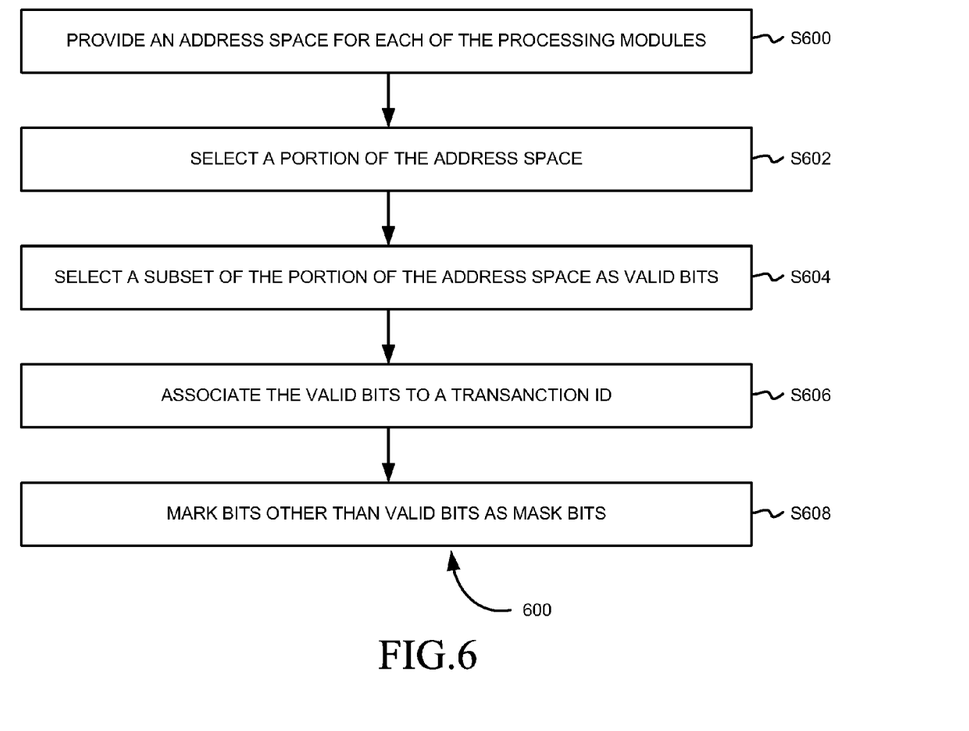
FIG. 6 illustrates a method of assigning a transaction ID based on the address space of a processing module according to an embodiment of this invention.

Now, referring to FIG. 6, a method of assigning a transaction ID based on the address space of a processing module according to an embodiment of this invention is disclosed.

In block S600, an address space for each of the processing module is provided. For example, column 404 of table 400 shows the address space allocated to each of the processing modules, Slave S0-Slave S7.

In block S602, a portion of the address space is selected. For example, a portion of the address space selected is shown in column 410 of table 400. The portion of the address space selected is common (or does not change) within the whole address space for the processing module. As an example, referring to column 410, a portion of the address space, in this case, bits [31:24] is selected.

In block S604, a subset of the portion of the address space is selected as Valid Bits. As an example, some of the bits of the selected portion of the address space is selected to define a unique bit pattern to represent each of the Slaves S0-S7. These bits are referred to as "Valid Bits".

As an example, referring to column 410 of table 400, for Slave S0, selected portion of the address space is 0000_xxxx. The Valid Bits for Slave S0 are bits [31:28]. As another example, for Slave S2, selected portion of the address space is 0001_0001. The Valid Bits for Slave S2 are bits [31:24].

In block S606, the Valid Bits for each of the Slaves S0-S7 are associated to a transaction ID. Now, referring back to FIG. 4, table 400, in column 412, an exemplary ID assigned to each of the Slaves S0-S7 is shown. For example, for Slave S1, an ID of 001 (binary) is assigned. For Slave S6, an ID of 110 (binary) is assigned. In one embodiment, the ID for slaves S0-S7 may be stored in Slave ID Registers 222. In one embodiment, the Valid Bits are used to access (or address) the Slave ID Register 222 and retrieve the corresponding ID for the Slaves S0-S7.

In block S608, bits other than Valid Bits are marked as Mask Bits. As an example, for Slave S0, selected portion of the address space is 0000_xxxx. The Valid Bits for Slave S0 are bits [31:28] and Mask Bits are bits [27:24]. As another example, for Slave S2, selected portion of the address space is 0001_0001. The Valid Bits for Slave S2 are bits [31:24] and there are no Mask Bits.

In one embodiment, the Valid Bits and Mask Bits for each of the slaves are stored in one or more registers of the Master. As an example, for DMA Master M0 102, the Valid Bits may be stored in Valid Bits Registers 218. Additionally, the Mask Bits may be stored in Mask Bits Registers 220 of DMA Master M0 102.

Figure 7:
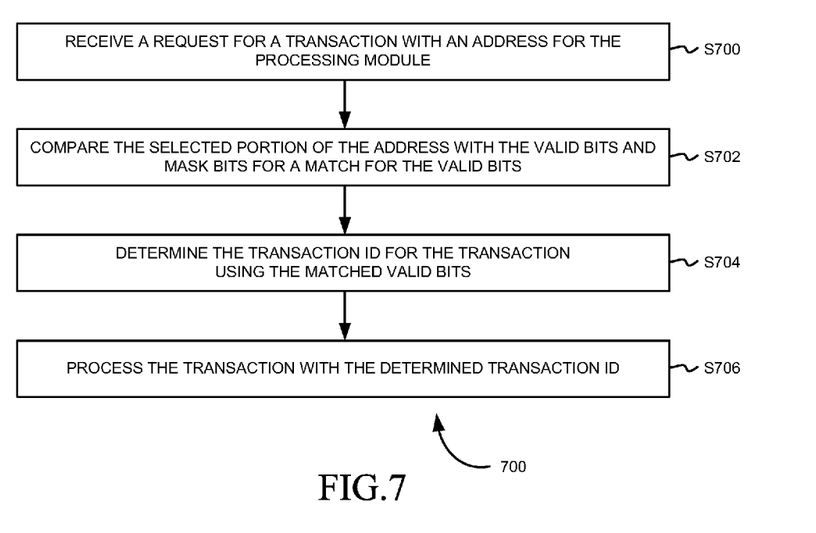
FIG. 7 illustrates a method of processing a transaction with an address for the processing module according to another embodiment of this invention.

Now referring to FIG. 7, a method of processing a transaction with an address for the processing module according to an embodiment of this invention will be described.

In block S700, a request for a transaction with an address for the processing module is received. For example, the request is received by the DMA Master M0.

In block S702, the selected portion of the address is compared with the Valid Bits and Mask Bits for a match of the Valid Bits. As an example, bits [31:24] of the address is selected. Then, the selected portion of the address is compared with the Valid Bits stored in the Valid Bits register 218 and Mask Bits register 220, to find a match between the selected portion of the address with a Valid Bits. Based on the unique selection of the Valid Bits, there will only be one match.

In block S704, using the matched Valid Bits, the transaction ID for the transaction is determined. As an example, using the matched Valid Bits, corresponding ID for the slave is retrieved from the Slave ID Register 222. This ID will be used as the transaction ID for the transaction.

In block S706, the transaction is processed with the determined transaction ID. As an example, the ID retrieved from the Slave ID Register 222 that corresponds to the matched Valid Bits is used to process the transaction.

In some embodiments, a slave with capability to process multiple transactions may be assigned multiple IDs. For example, Slave S0 may have capability to process multiple transactions, using two or more address spaces. In such situations, a subset of each of the address space may be selected as valid bits for Slave S0. And, each of the selected valid bits may be assigned different IDs. In this way, Slave S0 may be assigned different IDs to utilize its capability to process multiple transactions. As an example, referring to FIG. 4, the address space allocated to Slave S1 may instead be allocated to Slave S0. In such an example, Slave S0 will have two address space allocated, with two different Valid Bits selected and two different transaction IDs assigned.

In some embodiments, multiple slaves may be assigned a single ID. In such an example, a common subset of the address space of multiple slaves may be selected as valid bits and associating the selected valid bits to a transaction ID. In this way, when there is an address match to the valid bits, same transaction ID is assigned for multiple slaves.

The present invention may also include a non-transitory computer readable storage medium including instructions which can be used to program a computing device to perform a process in accordance with the present invention. The storage medium can include, but not limited to, any type of disk including floppy disk, optical disk, CD-ROM, magneto-optical disks, ROMS, RAMs, EPROMs, EEPROMS, flash memory, magnetic or optical cards, or any type of media suitable for storing electronic instructions.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuit (ASIC)).

What is claimed is:

1. A method for assigning transaction IDs to a plurality of processing modules in a network on a chip based system (NOCS), the method comprising, for each processing module:
   (a) providing an address space to each of the processing modules, the address space having a range of address values;
   (b) selecting a portion of the address values in the address space of the processing module;
   (c) selecting a subset of the portion of the address values in the address space for the processing module as valid bits; and
   (d) associating the valid bits of the processing module to a transaction ID.

2. The method of claim 1, wherein each processing module to is associated with a unique transaction ID.

3. The method of claim 1, further comprising marking bits of the subset of the portion of the address values in the address space other than the valid bits as mask bits for each processing module.

4. The method of claim 1, wherein the selected valid bits are different for each of the processing modules.

5. The method of claim 1, wherein:
   step (a) comprises providing a plurality of address subspaces to a first processing module;
   steps (b) and (c) comprise selecting a subset of a portion of the address values in each of the plurality of address subspaces as valid bits for the address subspace, where the selected valid bits are different for each of the plurality of address subspaces provided to the first processing module; and
   step (d) comprises associating each of the selected valid bits for each address subspace provided to the first processing module to a unique transaction ID.

6. A non-transitory computer readable medium having instructions for causing a computer to execute the method according to claim 1.

7. The method of claim 1, wherein:
   a first processing module of the system has a first number of valid bits; and
   a second processing module of the system has a second number of valid bits different from the first number of valid bits of the first processing module.

8. The method of claim 1, wherein:
   a first processing module of the system is associated with a first transaction ID; and
   a second processing module of the system is associated with a second transaction ID identical to the first transaction ID of the first processing module.

9. The method of claim 3, further comprising:
   (e) receiving a request for a transaction with an address in the address space provided to a first processing module;
   (f) comparing the selected portion of the address values for the first processing module with the associated valid bits and mask bits to determine a match for the valid bits; and
   (g) using the matched valid bits, determining the transaction ID to be used for the transaction.

10. A network on a chip based system, comprising:
    a plurality of processing modules, each processing module assigned an address space having a range of address values;
    a logic to specify a subset of a portion of the address values in the address space selected from the address space for each processing module as valid bits; and
    a logic to associate the valid bits of each processing module to a transaction ID.

11. The system of claim 10, further comprising a logic to specify bits of the subset of the portion of the address values in the address space other than the valid bits as-mask bits for each processing module.

12. The system of claim 10, wherein the logic to specify valid bits includes a valid bit register.

13. The system of claim 10, wherein the selected valid bits are different for each of the processing modules.

14. The system of claim 10, wherein:
    a first processing module is provided a plurality of address subspaces;
    a subset of a portion of address values in each of the plurality of address subspaces is selected as-valid bits, where the selected valid bits are different for each of the plurality of address subspaces; and
    the selected valid bits for each address subspace provided to the first processing module are associated to a unique transaction ID.

15. The system of claim 10, wherein:
    a first processing module of the system has a first number of valid bits; and
    a second processing module of the system has a second number of valid bits different from the first number of valid bits of the first processing module.

16. The system of claim 10, wherein:
    a first processing module of the system is associated with a first transaction ID; and a second processing module of the system is associated with a second transaction ID identical to the first transaction ID of the first processing module.

17. The system of claim 11, further including:

a logic to receive a request for a transaction with an address in the address space provided to a first processing module;

a logic to compare the selected portion of the address values for the first processing module with the associated valid bits and mask bits to determine a match for the valid bits; and a logic to determine the transaction ID to be used for the transaction based on the matched valid bits.

18. The system of claim 11, wherein the logic to specify mask bits includes a mask bit register.

* * * * *

UNITED STATES PATENT AND TRADEMARK OFFICE
CERTIFICATE OF CORRECTION

PATENT NO. : 8,533,377 B2  
APPLICATION NO. : 13/118376  
DATED : September 10, 2013  
INVENTOR(S) : Vallapaneni et al.

Page 1 of 1

It is certified that error appears in the above-identified patent and that said Letters Patent is hereby corrected as shown below:

In the Specifications

In column 2, line 56, delete "to".

Signed and Sealed this
Seventeenth Day of December, 2013

Margaret A. Focarino
*Commissioner for Patents of the United States Patent and Trademark Office*